H. M. WOOD.
DYNAMO-ELECTRIC MACHINE.
APPLICATION FILED FEB. 3, 1917.

1,430,712.

Patented Oct. 3, 1922.

WITNESSES:
A. J. Fitzgerald.
W. C. McCoy.

INVENTOR
Harry M. Wood.
BY
Wesley G. Carr.
ATTORNEY

Patented Oct. 3, 1922.

1,430,712

UNITED STATES PATENT OFFICE.

HARRY M. WOOD, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

Application filed February 3, 1917. Serial No. 146,431.

*To all whom it may concern:*

Be it known that I, HARRY M. WOOD, a citizen of the United States, and a resident of Edgewood Park, in the county of Allegheny and State of Pennsylvania, have invented a new and useful Improvement in Dynamo - Electric Machines, of which the following is a specification.

My invention relates to dynamo-electric machines, and has for its object to provide a motor-generator set which shall be enclosed in a single frame and be of minimum size and weight.

According to my invention, I provide a dynamo-electric machine in which the generating unit is positioned at the center of the dynamo-electric-machine frame and the motor armatures are assembled around the generator armature in the same frame and are geared to the generator armature.

Figure 1:
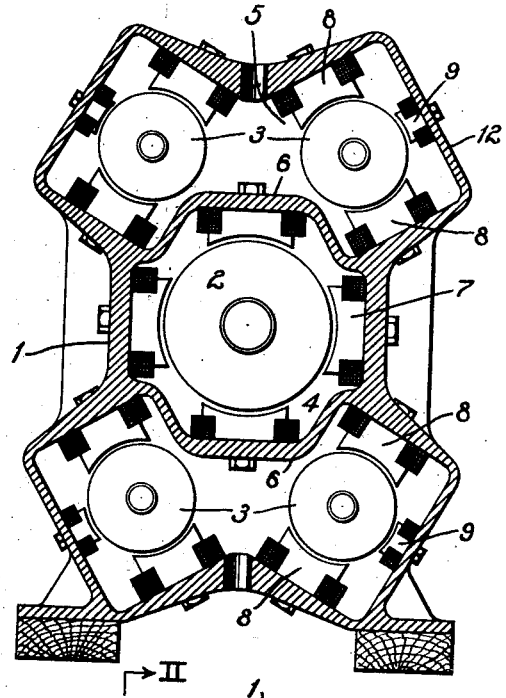
Figure 2:
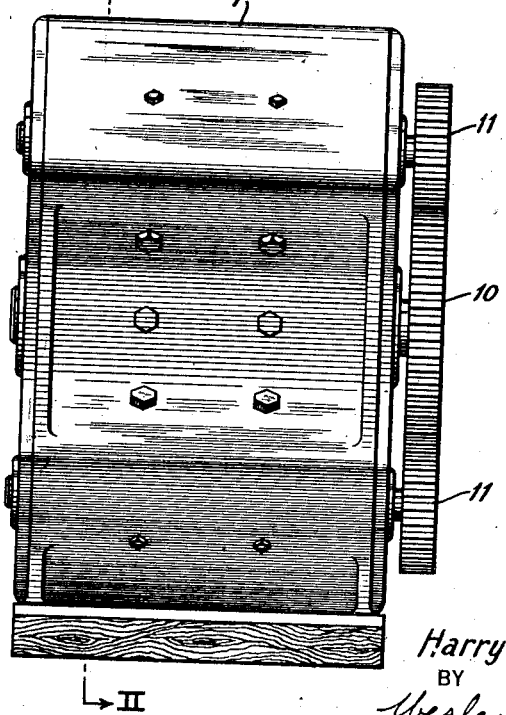

Figure 1 of the accompanying drawing is a side elevational view of a dynamo-electric machine constructed in accordance with my invention, and Fig. 2 is a sectional view taken on the line II—II of Fig. 1.

The dynamo-electric machine shown in the drawing comprises a frame 1, a generator armature 2, which is centrally mounted in the frame 1, and a plurality of motor armatures 3 that are grouped around the armature 2. The frame 1 comprises a central compartment 4 and end compartments 5 that are separated from the central compartment by magnetizable walls 6. The central compartment 4 is provided with a plurality of main pole pieces 7 that furnish the magnetic flux for the generator armature 2, and each of the compartments 5 is provided with a plurality of pairs of pole pieces 8 and a corresponding auxiliary pole 9 that furnish the magnetic flux for the motor armatures 3. A gear wheel 10 is mounted upon the shaft for the armature 2 and is adapted to be operated by pinions 11 which are respectively connected to the shafts for the motor armatures 3.

The flux path for the generator portion of the dynamo-electric machine is the same as that for any four-pole machine of a like structure in which each pair of poles has an individual magnetic path. The main path for the magnetic flux for the motor armatures 3 extends through all of the pole pieces 8 and the armatures 3 in series-circuit relation.

The armatures 3 may be connected in series-circuit relation across a direct-current voltage of large magnitude in order to generate an electric current of relatively low voltage in the armature 2 to be used for auxiliary apparatus such as is generally required in railway-locomotive construction.

If it is desired not to use the auxiliary pole pieces 9, the portions 12 of the frame 1 may be omitted, thus exposing a large portion of the motor armature surfaces to the outside atmosphere.

Although I have described my invention in a simple and preferred form, it should not be so limited. I desire therefor, that only such limitations shall be imposed as are indicated in the appended claims.

I claim as my invention:

1. A dynamo-electric aggregate comprising a plurality of distinct dynamo-electric machines, the flux-path of one of said machines being substantially surrounded by the flux-path of other of said machines.

2. In a motor-generator aggregate, a centrally disposed generating unit and a plurality of motor units clustered there-around, said motor units having a common flux-path surrounding said generating unit.

3. In a motor-generator aggregate, a centrally disposed generating unit having a polygonal stator-core, and a plurality of motor units clustered about said core, said motor units having a common flux-path including the outer portions of certain of the walls of said core-member.

4. A dynamo-electric machine comprising a frame, an armature centrally mounted in said frame, a plurality of armatures grouped in said frame around said centrally-mounted armature, and individual pole pieces for each of said armatures, said centrally mounted armature having a plurality of individual magnetic circuits and the surrounding armatures having a common magnetic circuit.

5. A dynamo-electric machine comprising a frame, a generator armature centrally mounted in said frame, a plurality of pole pieces for said generator, a plurality of motor armatures grouped around said generator armature, individual pole pieces for each of said motor armatures, all of said individual pole pieces having a common magnetic circuit, and means for driving said generator armature from said motor armatures.

6. In a motor-generator aggregate, a centrally disposed generating unit having a substantially octagonal field frame and four motor units disposed in pairs on opposite sides of said frame, said motor units having a common flux-path including the outer portions of two oppositely disposed walls of said frame.

In testimony whereof, I have hereunto subscribed my name this twenty-ninth day of January 1917.

HARRY M. WOOD.